US011292945B2

(12) United States Patent
Iwashita et al.

(10) Patent No.: US 11,292,945 B2
(45) Date of Patent: Apr. 5, 2022

(54) ADHESIVE RESIN COMPOSITION AND LAMINATE

(71) Applicant: MITSUI CHEMICALS, INC., Tokyo (JP)

(72) Inventors: Akihiko Iwashita, Ichihara (JP); Yoshiyuki Ogawa, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 28 days.

(21) Appl. No.: 17/046,626

(22) PCT Filed: Apr. 5, 2019

(86) PCT No.: PCT/JP2019/015117
§ 371 (c)(1),
(2) Date: Oct. 9, 2020

(87) PCT Pub. No.: WO2019/208169
PCT Pub. Date: Oct. 31, 2019

(65) Prior Publication Data
US 2021/0108112 A1    Apr. 15, 2021

(30) Foreign Application Priority Data

Apr. 25, 2018 (JP) .............................. JP2018-083800

(51) Int. Cl.
| | | |
|---|---|---|
| *B65D 65/40* | (2006.01) | |
| *C09J 151/06* | (2006.01) | |
| *C09J 123/26* | (2006.01) | |
| *C09J 151/00* | (2006.01) | |
| *B32B 7/12* | (2006.01) | |
| *B32B 27/08* | (2006.01) | |
| *B32B 27/32* | (2006.01) | |
| *B32B 27/34* | (2006.01) | |
| *B32B 1/00* | (2006.01) | |
| *B32B 27/30* | (2006.01) | |

(52) U.S. Cl.
CPC .............. *C09J 151/003* (2013.01); *B32B 1/00* (2013.01); *B32B 7/12* (2013.01); *B32B 27/08* (2013.01); *B32B 27/306* (2013.01); *B32B 27/32* (2013.01); *B32B 27/34* (2013.01); *B65D 65/40* (2013.01); *C09J 123/26* (2013.01); *C09J 151/00* (2013.01); *B32B 2250/04* (2013.01); *B32B 2250/24* (2013.01); *B32B 2439/46* (2013.01); *C09J 2301/312* (2020.08)

(58) Field of Classification Search
None
See application file for complete search history.

(56) References Cited

U.S. PATENT DOCUMENTS

| 4,670,349 | A | 6/1987 | Nakagawa et al. |
| 6,183,863 | B1 * | 2/2001 | Kawachi ............... C08F 255/00 |
| | | | 428/355 AC |
| 6,214,426 | B1 | 4/2001 | Kawachi et al. |
| 6,656,601 | B1 | 12/2003 | Kawachi et al. |
| 6,777,491 | B1 | 8/2004 | Kawachi et al. |
| 8,298,636 | B2 | 10/2012 | Kani et al. |
| 8,753,729 | B2 | 6/2014 | Omasa et al. |
| 2012/0052225 | A1 | 3/2012 | Kani et al. |
| 2014/0017428 | A1 | 1/2014 | Omasa et al. |
| 2017/0240784 | A1 | 8/2017 | Jin et al. |

FOREIGN PATENT DOCUMENTS

| CN | 1460117 A | 12/2003 |
| CN | 103443231 A | 12/2013 |
| EP | 0 479 457 A1 | 4/1992 |
| EP | 0 834 415 A2 | 4/1998 |
| EP | 1 298 168 A1 | 4/2003 |
| JP | S59-068351 A | 4/1984 |
| JP | S61-162539 A | 7/1986 |
| JP | S63-054478 A | 3/1988 |
| JP | H05-051496 A | 3/1993 |
| JP | H09-087603 A | 3/1997 |
| JP | H10-316806 A | 12/1998 |
| JP | 2010-254968 A | 11/2010 |
| JP | 2011-202147 A | 10/2011 |
| KR | 10-1998-0081668 A | 11/1998 |
| KR | 10-2013-0131486 A | 12/2013 |
| WO | WO-97/10297 A1 | 3/1997 |

OTHER PUBLICATIONS

International Search Report dated Jun. 18, 2019 for corresponding International Patent Application No. PCT/JP2019/015117.
Written Opinion dated Jun. 18, 2019 for corresponding International Patent Application No. PCT/JP2019/015117.

* cited by examiner

*Primary Examiner* — Sheeba Ahmed
(74) *Attorney, Agent, or Firm* — Foley & Lardner LLP

(57) ABSTRACT

An adhesive resin composition of the invention includes an ethylene polymer (A) including an ethylene polymer graft-modified with an unsaturated carboxylic acid or a derivative thereof, and satisfies the following requirements (1) to (4). (1) The melt flow rate (MFR) measured at a temperature of 190° C. and a load of 2160 g in accordance with ASTM D 1238 is 0.1 to 3 g/10 min. (2) The density is 910 to 930 kg/m$^3$. (3) The proportion of fractions that elute at 50° C. and below in crystallization elution fractionation chromatography measurement is not less than 20 mass %. (4) The proportion of fractions that elute at 90° C. and above in crystallization elution fractionation chromatography measurement is not less than 25 mass %.

9 Claims, No Drawings

ADHESIVE RESIN COMPOSITION AND LAMINATE

RELATED APPLICATIONS

The present application claims priority under 37 U.S.C. § 371 to International Patent Application No. PCT/JP2019/015117, filed Apr. 5, 2019, which claims priority to and the benefit of Japanese Patent Application No. 2018-083800, filed on Apr. 25, 2018. The contents of these applications are hereby incorporated by reference in their entireties.

TECHNICAL FIELD

The present invention relates to an adhesive resin composition and a laminate. More specifically, the present invention relates to an adhesive resin composition having high adhesion with respect to gas barrier resins, and to a high-barrier laminate which includes a layer including the adhesive resin composition.

BACKGROUND ART

Polyethylenes are excellent in properties such as transparency, flexibility, hygienic quality and processability, and are also inexpensive, thus finding widespread use as packages and containers for various foods, chemicals and the like.

Polyethylenes have high gas permeability and thus cannot be used alone as packages or containers. In most cases, polyethylenes are used as packages or containers in the form of laminates with other materials having high gas barrier properties, for example, gas barrier resins such as polyamides and ethylene/vinyl alcohol copolymers. Further, polyethylenes are non-polar materials and show little adhesive strength. Numerous improvements have been made in the lamination of polyethylenes on gas barrier resins.

For example, Patent Literature 1 discloses a laminate which includes a layer of a polyethylene resin composition including an ethylene polymer and a modified ethylene polymer, and a layer of a material such as a saponified ethylene/vinyl acetate copolymer, a polyamide or a polyester. Patent Literature 1 describes that the resin composition has excellent adhesion with respect to other resins and does not lower its adhesion even when exposed to heat, water, salt water or the like.

The recent growth in the demand for the reduction of food waste has accelerated the shift to high-barrier food packaging materials, and higher barrier properties are required of gas barrier resins such as ethylene/vinyl alcohol copolymers. In order to meet such demands, there is recently an increasing trend to lowering the ethylene content in gas barrier resins to enhance the gas barrier properties.

However, gas barrier resins such as ethylene/vinyl alcohol copolymers become hard and brittle when reduced in ethylene content. Additives (such as styrene elastomers) are added to soften these resins such as ethylene/vinyl alcohol copolymers (Patent Literatures 2 and 3). However, such additives inhibit bonding with polyethylenes. In many cases, conventional adhesive resins offer insufficient adhesive strength between polyethylenes and gas barrier resins.

CITATION LIST

Patent Literature

Patent Literature 1: JP-A-S59-068351
Patent Literature 2: JP-A-2010-254968
Patent Literature 3: JP-A-2011-202147

SUMMARY OF INVENTION

Technical Problem

It is an object of the present invention to provide an adhesive resin having excellent adhesive strength with respect to gas barrier resins such as ethylene/vinyl alcohol copolymers.

Solution to Problem

The present invention which achieves the above object pertains to the following [1] to [9].

[1] An adhesive resin composition comprising an ethylene polymer (A) comprising an ethylene polymer graft-modified with an unsaturated carboxylic acid or a derivative thereof, the adhesive resin composition satisfying the following requirements (1) to (4):

(1) the melt flow rate (MFR) measured at a temperature of 190° C. and a load of 2160 g in accordance with ASTM D 1238 is 0.1 to 3 g/10 min,
(2) the density is 910 to 930 kg/m$^3$,
(3) the proportion of fractions that elute at 50° C. and below in crystallization elution fractionation chromatography measurement is not less than 20 mass %, and
(4) the proportion of fractions that elute at 90° C. and above in crystallization elution fractionation chromatography measurement is not less than 25 mass %.

[2] The adhesive resin composition described in [1], wherein the ethylene polymer (A) comprises 20 to 40 mass % of an ethylene polymer (A1) described below and 60 to 80 mass % of an ethylene polymer (A2) described below [with the proviso that the total of the ethylene polymer (A1) and the ethylene polymer (A2) is 100 mass %], and at least one of the ethylene polymer (A1) and the ethylene polymer (A2) comprises an ethylene polymer graft-modified with an unsaturated carboxylic acid or a derivative thereof, (A1) the ethylene polymer has a density of 930 to 965 kg/m$^3$ and a melt flow rate (MFR) of 0.1 to 10 g/10 min as measured at a temperature of 190° C. and a load of 2160 g in accordance with ASTM D 1238,
(A2) the ethylene polymer has a density of 858 to 929 kg/m$^3$ and a melt flow rate (MFR) of 0.1 to 10 g/10 min as measured at a temperature of 190° C. and a load of 2160 g in accordance with ASTM D 1238.

[3] A laminate comprising a layer (I) including an ethylene polymer, an adhesive layer (II) including an adhesive resin composition described in [1] or [2], and a layer (III) including an ethylene/vinyl alcohol copolymer and/or a layer (IV) including a polyamide resin, the layer (II) being in direct contact with at least one of the layer (III) and the layer (IV).

[4] The laminate described in [3], wherein the ethylene/vinyl alcohol copolymer is a polymer obtained by saponifying an ethylene/vinyl acetate copolymer having a content of ethylene-derived structural units of 20 to 30 mol %.

[5] The laminate described in [3], wherein the layer (III) further includes 10 to 40 mass % of a styrene elastomer.

[6] The laminate described in any of [3] to [5], wherein the polyamide resin comprises at least one of nylon 6, nylon 66, nylon 610, nylon 12, nylon 11, MXD nylon, amorphous nylons and copolymer nylons.

[7] A film comprising a laminate described in any of [3] to [6].

[8] A bag comprising a film described in [7].

[9] A packaging container comprising a laminate described in any of [3] to [6].

Advantageous Effects of Invention

The adhesive resin composition of the present invention exhibits excellent adhesive strength with respect to gas barrier resins such as ethylene/vinyl alcohol copolymers. The laminate includes an adhesive layer including the above adhesive resin composition, and a gas barrier resin layer in direct contact with the adhesive layer. These two layers bond strongly to each other and are resistant to separation from each other even in the case where, for example, the gas barrier resin layer contains a softener additive. Thus, the laminate may be effectively used as high-barrier packages, containers and the like.

DESCRIPTION OF EMBODIMENTS (Adhesive Resin Compositions)

An adhesive resin composition of the present invention comprises an ethylene polymer (A) comprising an ethylene polymer graft-modified with an unsaturated carboxylic acid or a derivative thereof.

In a preferred embodiment of the ethylene polymers (A), the ethylene polymer (A) comprises an ethylene polymer (A1) and an ethylene polymer (A2) described below, and at least one of the ethylene polymers (A1) and (A2) comprises an ethylene polymer graft-modified with an unsaturated carboxylic acid or a derivative thereof.

(A1) The ethylene polymer has a density of 930 to 965 $kg/m^3$ and a melt flow rate (MFR) of 0.1 to 10 g/10 min as measured at a temperature of 190° C. and a load of 2160 g in accordance with ASTM D 1238.

(A2) The ethylene polymer has a density of 858 to 929 $kg/m^3$ and a melt flow rate (MFR) of 0.1 to 10 g/10 min as measured at a temperature of 190° C. and a load of 2160 g in accordance with ASTM D 1238.

The density of the ethylene polymer (A1) is 930 to 965 $kg/m^3$, and preferably 940 to 965 $kg/m^3$. By using the ethylene polymer (A1) having a density in this range, the adhesive resin composition that is obtained tends to attain excellent adhesion.

The melt flow rate (MFR) of the ethylene polymer (A1) is 0.1 to 10 g/10 min, and preferably 0.2 to 8 g/10 min as measured at 190° C. under 2160 g load in accordance with ASTM D 1238. If a polymer is added which has an MFR of less than 0.1 g/10 min, the adhesive resin composition that is obtained may be difficult to extrude and the pressure in a forming apparatus may exceed the critical pressure. If, on the other hand, a polymer is added which has an MFR of more than 10 g/10 min, the adhesive resin composition that is obtained tends to be formed into articles with nonuniform thickness, and further the molecular weight is so low that properties such as impact strength of laminates may be deteriorated.

The density of the ethylene polymer (A2) is 858 to 929 $kg/m^3$, and preferably 865 to 925 $kg/m^3$. By using the ethylene polymer (A2) having a density in this range, the adhesive resin composition that is obtained tends to attain excellent adhesion.

The melt flow rate (MFR) of the ethylene polymer (A2) is 0.1 to 10 g/10 min, and preferably 0.5 to 7 g/10 min as measured at 190° C. under 2160 g load in accordance with ASTM D 1238. If a polymer is added which has an MFR of less than 0.1 g/10 min, the adhesive resin composition that is obtained may be difficult to extrude and the pressure in a forming apparatus may exceed the critical pressure. If, on the other hand, a polymer is added which has an MFR of more than 10 g/10 min, the adhesive resin composition that is obtained tends to be formed into articles with nonuniform thickness, and further the molecular weight is so low that properties such as impact strength of laminates may be deteriorated.

At least one of the ethylene polymers (A1) and (A2) comprises an ethylene polymer graft-modified with an unsaturated carboxylic acid or a derivative thereof. That is, for example, the ethylene polymer (A1) may comprise such a modified ethylene polymer, and the ethylene polymer (A2) may not comprise such a modified ethylene polymer. In other embodiments, the ethylene polymer (A1) may not comprise a modified ethylene polymer and the ethylene polymer (A2) may comprise a modified ethylene polymer, or both the ethylene polymer (A1) and the ethylene polymer (A2) may comprise a modified ethylene polymer.

When the ethylene polymer (A1) or (A2) comprises a modified ethylene polymer, the amount of the unsaturated carboxylic acid or derivative thereof grafted in the ethylene polymer (A1) or (A2) is usually in the range of 0.01 to 10 mass %, and preferably 0.02 to 5 mass %. If the amount of grafts is less than 0.01 mass %, the adhesive strength may be insufficient. If the amount of grafts is more than 10 mass %, the quality of the modified ethylene polymer may be destabilized by facilitated crosslinking reaction.

Examples of the unsaturated carboxylic acids and derivatives thereof include unsaturated carboxylic acids such as acrylic acid, maleic acid, fumaric acid, tetrahydrophthalic acid, itaconic acid, citraconic acid, crotonic acid, isocrotonic acid and nadic acid (endocis-bicyclo[2.2.1]hept-5-ene-dicarboxylic acid); and derivatives thereof such as, for example, acid halides, amide imides, anhydrides and esters. Specific examples of such derivatives include maleyl chloride, maleimide, maleic anhydride, citraconic anhydride, monomethyl maleate, dimethyl maleate and glycidyl maleate. Of these, unsaturated dicarboxylic acids and acid anhydrides thereof are preferable, and maleic acid, nadic acid and acid anhydrides thereof are particularly preferable.

The modified ethylene polymer may be produced by various known methods. For example, a method may be adopted in which an ethylene polymer is dissolved into an organic solvent, then an unsaturated carboxylic acid or a derivative thereof and, if necessary, a radical initiator such as an organic peroxide are added to the solution, and the mixture is reacted usually at a temperature of 60 to 350° C., preferably 80 to 190° C., for 0.5 to 15 hours, preferably 1 to 10 hours. Alternatively, a method may be adopted in which an ethylene polymer, an unsaturated carboxylic acid or a derivative thereof and, if necessary, a radical initiator such as an organic peroxide are reacted in the absence of a solvent in an extruder or the like usually at a temperature not less than the melting point of the ethylene polymer, preferably 120 to 350° C., for 0.5 to 10 minutes.

The ethylene polymers without modification, that is, unmodified ethylene polymers which are included in the ethylene polymer (A1) and the ethylene polymer (A2), and the raw ethylene polymers before modification into the modified ethylene polymers are ethylene homopolymers or copolymers of ethylene and α-olefins. Examples of the α-olefins include α-olefins having 3 or more carbon atoms, with those having 3 to 10 carbon atoms being preferable. Specific examples include propylene, 1-butene, 1-pentene, 1-hexene, 1-octene, 1-decene, 4-methyl-1-pentene, and combinations of two or more thereof. The amount of the α-olefin comonomer is not particularly limited as long as a density within the aforementioned range is obtained, but is usually not more than 10 mol %. The density of the raw ethylene polymer is not particularly limited as long as the density of the modified ethylene polymer that is obtained is within the aforementioned range.

The raw ethylene polymer may be produced by a known method, for example, a high pressure method or a low pressure method using a Ziegler Ti catalyst, a Co catalyst, a metallocene catalyst or the like.

The proportions of the ethylene polymer (A1) and the ethylene polymer (A2) in the ethylene polymer (A) are preferably 20 to 40 mass % ethylene polymer (A1) and 60 to 80 mass % ethylene polymer (A2), and more preferably 23 to 37 mass % ethylene polymer (A1) and 63 to 77 mass % ethylene polymer (A2) based on the total of the ethylene polymer (A1) and the ethylene polymer (A2) taken as 100% by weight. When the proportions of the ethylene polymer (A1) and the ethylene polymer (A2) are in the above ranges, the adhesive resin composition exhibits higher adhesive strength.

The ethylene polymer (A1) and the ethylene polymer (A2) may each comprise a single ethylene polymer, or may each comprise two or more kinds of ethylene polymers.

When the ethylene polymer (A1) comprises two or more kinds of ethylene polymers, the two or more kinds of ethylene polymers each satisfy the density and melt flow rate requirements described with respect to the ethylene polymer (A1).

Similarly, when the ethylene polymer (A2) comprises two or more kinds of ethylene polymers, the two or more kinds of ethylene polymers each satisfy the density and melt flow rate requirements described with respect to the ethylene polymer (A2).

The adhesive resin composition of the present invention satisfies the following requirements (1) to (4).

(1) The melt flow rate (MFR) measured at a temperature of 190° C. and a load of 2160 g in accordance with ASTM D 1238 is 0.1 to 3 g/10 min, and preferably 0.5 to 2 g/10 min. When the melt flow rate is in this range, the adhesive resin composition attains excellent formability.

(2) The density is 910 to 930 kg/m$^3$, preferably 913 to 927 kg/m$^3$, more preferably 914 to 925 kg/m$^3$, and still more preferably 915 to 920 kg/m$^3$. If the density is less than 910 kg/m$^3$, the adhesive resin composition used in, for example, containers or the like may show insufficient mechanical strength and tends to lower the interlaminar adhesion when subjected to a high temperature of not less than 80° C. If the density is more than 930 kg/m$^3$, a laminate of such an adhesive resin composition with, for example, an ethylene/vinyl alcohol copolymer or the like will have unstable interlaminar adhesion and tends to have low drop impact strength at low temperatures.

(3) The proportion of fractions that elute at 50° C. and below in crystallization elution fractionation chromatography (CEF) measurement is not less than 20 mass %, and preferably not less than 23 mass %. The proportion of fractions that elute at 50° C. and below is preferably not more than 45 mass %, and more preferably not more than 40 mass %.

(4) The proportion of fractions that elute at 90° C. and above in crystallization elution fractionation chromatography (CEF) measurement is not less than 25 mass %, and preferably not less than 28 mass %. The proportion of fractions that elute at 90° C. and above is preferably not more than 45 mass %, and more preferably not more than 40 mass %.

The adhesive resin composition attains higher adhesive strength by its satisfying the above requirements (3) and (4) regarding the crystallization elution fractionation chromatography measurement. The proportions of the above fractions eluting in the crystallization elution fractionation chromatography measurement may be appropriately controlled by those skilled in the art.

The adhesive resin composition of the present invention may be prepared by various known methods, for example, by dry blending the ethylene polymer (A1) and the ethylene polymer (A2) in the proportions described hereinabove using a Henschel mixer, a tumbler blender, a V-blender or the like, by melt-kneading such a dry blend with a single-screw extruder, a multi-screw extruder, a Banbury mixer or the like, or by stirring and mixing the polymers in the presence of a solvent.

Where necessary, the adhesive resin composition of the present invention may contain conventional additives such as antioxidants, weathering stabilizers, antistatic agents, antifogging agents, antiblocking agents, lubricants, nucleating agents and pigments, or other materials such as additional polymers and rubbers, while still achieving the object of the present invention.

(Laminates)

A laminate of the present invention includes a layer (I) including an ethylene polymer, an adhesive layer (II) including the adhesive resin composition described above, and a layer (III) including an ethylene/vinyl alcohol copolymer and/or a layer (IV) including a polyamide resin. The layer (II) is in direct contact with at least one of the layer (III) and the layer (IV).

The laminate of the present invention may further include a regrind layer (V) between the ethylene polymer-containing layer (I) and the adhesive layer (II). The regrind layer (V) is a layer of a material (a regrind) produced by crushing wastes such as burrs (undesired portions) occurring in the formation of laminates, discarded laminates (scraps) and rejects generated at the time of forming, and if necessary melt-kneading the crushed wastes using an extruder or the like. The regrind layer (V) does not necessarily consist of the above-mentioned wastes alone, and, for example, the ethylene polymer used in the layer (I) may be blended into the regrind layer (V) to enhance mechanical properties.

The layers that constitute the laminate of the present invention may each contain known additives such as fillers, stabilizers, lubricants, antistatic agents, flame retardants and foaming agents without impairing the object of the present invention.

The ethylene polymer contained in the layer (I) is an ethylene homopolymer or a random copolymer of ethylene and an α-olefin. The amount of the α-olefin comonomer is not particularly limited as long as the density of the ethylene polymer is within the range described below, but is usually preferably not more than 10 mol %, and more preferably not more than 5 mol %. The α-olefin is preferably an α-olefin having 3 to 10 carbon atoms, with specific examples including propylene, 1-butene, 1-hexene, 4-methyl-1-pentene, 1-octene and 1-decene.

The melt flow rate (MFR) [ASTM D 1238 (temperature: 190° C., load: 2160 g load)] of the ethylene polymer is preferably in the range of 0.01 to 5.0 g/10 min, and more preferably 0.05 to 4 g/10 min. The density of the ethylene polymer is preferably in the range of 940 to 980 kg/m$^3$, and more preferably 950 to 970 kg/m$^3$. If an ethylene polymer having an MFR exceeding the above range is used, the laminate that is obtained may exhibit insufficient impact strength. On the other hand, an ethylene polymer having an MFR below the above range tends to be difficult to extrude. If an ethylene polymer having a lower density than the above range is used, the laminate that is obtained may have unsatisfactory permeability.

The layer (III) and the layer (IV) are gas barrier resin layers.

The ethylene/vinyl alcohol copolymer (hereinafter, also written as EVOH) contained in the layer (III) is preferably obtained by saponifying an ethylene/vinyl acetate copolymer having an ethylene content of 20 to 30 mol %, preferably 22 to 29 mol %. The saponification degree, although not particularly limited, is, for example, 90 to 100%, and preferably 95 to 100%. A saponified product having an ethylene content of less than 20 mol % has a melting point and a decomposition temperature that are close to each other, and thus may be difficult to finely disperse in the ethylene polymer. If the ethylene content is excessively high, the copolymer may show low barrier properties and may fail to meet the object of the present invention.

The EVOH contained in the layer (III) may be a polymer which further includes 10 to 40 mass % of a styrene elastomer. The styrene elastomer can impart flexibility to the film while ensuring that the layer (III) maintains excellent gas barrier properties.

Specific examples of the styrene elastomers include styrene-butadiene-styrene block copolymer (SBS), styrene-isoprene-styrene block copolymer (SIS), hydrogenated SBS block copolymer (SEBS), hydrogenated SIS block copolymer (SEPS), block copolymer (SBBS) obtained by hydrogenating vinyl bonds in the butadiene block of SBS, styrene-isobutylene-styrene triblock copolymer (SIBS), and styrene-ethylene-butylene-crystalline polyolefin block copolymer (SEBC). Of these, SEBS which is excellent in thermal stability and weather resistance is preferably used. In SEBS, the polybutadiene block is hydrogenated into an ethylene/butylene copolymer block.

Examples of the polyamides contained in the layer (IV) include nylon 6, nylon 66, nylon 610, nylon 12, nylon 11, MXD nylon, amorphous nylons and copolymer nylons.

Examples of the layered configurations of the laminates of the present invention include trilaminar structures represented by layer (I) including ethylene polymer (hereinafter, written as "PE layer (I)")/adhesive layer (II) including adhesive resin composition (hereinafter, written as "adhesive layer (II)")/layer including ethylene/vinyl alcohol copolymer (hereinafter, written as "EVOH layer") (III), and PE layer (I)/adhesive layer (II)/layer including polyamide resin (hereinafter, written as "NY layer") (IV).

Other layered configurations are also usable, for example:

tetralaminar structures represented by PE layer (I)/regrind layer (V)/adhesive layer (II)/EVOH layer (III), PE layer (I)/regrind layer (V)/adhesive layer (II)/NY layer (IV), PE layer (I)/adhesive layer (II)/EVOH layer (III)/adhesive layer (II), and PE layer (I)/adhesive layer (II)/NY layer (IV)/adhesive layer (II);

pentalaminar structures represented by PE layer (I)/regrind layer (V)/adhesive layer (II)/EVOH layer (III)/adhesive layer (II), PE layer (I)/regrind layer (V)/adhesive layer (II)/NY layer (IV)/adhesive layer (II), PE layer (I)/adhesive layer (II)/EVOH layer (III)/adhesive layer (II)/PE layer (I), and PE layer (I)/adhesive layer (II)/NY layer (IV)/adhesive layer (II)/PE layer (I);

hexalaminar structures represented by PE layer (I)/regrind layer (V)/adhesive layer (II)/EVOH layer (III)/adhesive layer (II)/PE layer (I), and PE layer (I)/regrind layer (V)/adhesive layer (II)/NY layer (IV)/adhesive layer (II)/PE layer (I); and heptalaminar structures represented by PE layer (I)/regrind layer (V)/adhesive layer (II)/EVOH layer (III)/adhesive layer (II)/regrind layer (V)/PE layer (I), and PE layer (I)/regrind layer (V)/adhesive layer (II)/NY layer (IV)/adhesive layer (II)/regrind layer (V)/PE layer (I).

The laminates of the present invention may be produced by known forming methods such as, for example, coextrusion film forming, sheet forming, coating, blowing and extrusion lamination.

The laminates of the present invention have excellent gas barrier properties, and exhibit superior interlaminar adhesion, durability and heat resistant adhesion. The laminates of the present invention may be used in numerous applications by virtue of these characteristics. For example, a film including the laminate of the present invention may be constructed from the laminate, and a bag may be further produced from such a film. Further, a packaging container including the laminate of the present invention may be constructed from the laminate.

EXAMPLES

Next, the present invention will be described in greater detail by presenting Examples. However, it should be construed that the scope of the present invention is not limited to such Examples without departing from the spirit of the invention.

Properties in Examples and Comparative Examples were measured by the following measurement methods.
(1) Melt Flow Rate (MFR) (g/10 min)

The melt flow rate was measured at a temperature of 190° C. and a load of 2160 g in accordance with ASTM D 1238.
(2) Density (kg/m$^3$)

The density was measured in accordance with ASTM D 1505.
(3) Proportion (%) of Fractions Eluting at 50° C. and Below, and Proportion (%) of Fractions Eluting at 90° C. and Above The proportion of fractions eluting at 50° C. and below, and the proportion of fractions eluting at 90° C. and above were determined from the ratio of the peak area of the fractions which eluted at 50° C. and below, and the ratio of the peak area of the fractions which eluted at 90° C. and above relative to the total peak area in crystallization elution fractionation chromatography (CEF).
(4) Adhesive Strength (N/15 mm)

The initial adhesive strength of a laminate was measured in such a manner that a 15 mm wide sample was cut out from a lateral side of the laminate, and the inner face of an adhesive layer (II) and a layer (III) including an ethylene/vinyl alcohol copolymer were separated from each other in a thermostatic chamber at 23° C. to measure the adhesive strength. The separation test mode was the T-peel test at a peel rate of 300 mm/min. This measurement was performed 5 times, and the values obtained were averaged to give the adhesive strength of the laminate.
(5) Melting Point (° C.)

The melting point was measured by DSC. Specifically, a sample approximately weighing 5 to 10 mg was placed into a special aluminum pan, and was heated from 30° C. to 200° C. at 500° C./min, held at 200° C. for 10 minutes, cooled from 200° C. to 30° C. at 10° C./min, held at 30° C. for 1 minute, and then heated at 10° C./min. The melting point was determined from the endothermic curve recorded during the final heating.

Table 1 describes PE-0, PE-1, PE-2, PE-3, PE-4 and PE-5 which are the ethylene polymers used in Examples and Comparative Examples (hereinafter, these polymers will be also written as the ethylene polymers (PE-0) to (PE-5), respectively). These ethylene polymers were each prepared by polymerization according to a conventional method. In Table 1, the amount of MAH means the amount of grafts by maleic anhydride used as an "unsaturated carboxylic acid or derivative thereof" component, and the comonomer content means the molar ratio of structural units derived from a comonomer relative to all the structural units forming the ethylene polymer.

TABLE 1

| Ethylene polymers | MFR g/10 min | Density kg/m³ | Amount of MAH mass % | Comonomer — | Comonomer content mol % |
|---|---|---|---|---|---|
| PE-0 | 5 | 965 | 2.4 | — | 0 |
| PE-1 | 0.3 | 950 | 1 | Propylene | 0.8 |
| PE-2 | 1 | 922 | — | 1-Butene | 4 |
| PE-3 | 0.6 | 870 | — | Propylene | 19 |
| PE-4 | 2.3 | 885 | 1 | 1-Butene | 12 |
| PE-5 | 0.4 | 956 | — | 1-Butene | 0.5 |

Example 1

A mixture was prepared by mixing 9 mass % of the ethylene polymer (PE-0) and 26 mass % of the ethylene polymer (PE-5) as ethylene polymer (A1), and 35 mass % of the ethylene polymer (PE-2) and 30 mass % of the ethylene polymer (PE-3) as ethylene polymer (A2). The mixture was melt-kneaded in a single-screw extruder to give an adhesive resin composition (1). The adhesive resin composition (1) obtained had a density of 0.919 g/cm³, and an MFR of 0.8 g/10 min measured at 190° C. under 2.16 kg load in accordance with ASTM D 1238.

Using the adhesive resin composition (1), a laminate (a film) composed of five layers was produced by coextrusion under the forming conditions described below. The pentalaminar film obtained was tested by the aforementioned method to determine the interlaminar adhesive strength (the peel strength) between an EVOH layer (III) and an adhesive layer (II) of the adhesive resin composition (1). The results are described in Table 2.

(Laminate Forming Conditions)
Layered Configuration:
 LLDPE layer (I)/adhesive layer (II)/EVOH layer (III)/adhesive layer (II)/LLDPE layer (I)

Layer Thicknesses:
LLDPE layer (I): 350 μm
Adhesive layer (II): 20 μm
EVOH layer (III): 20 μm T-Die Forming Machines:
LLDPE layer (I): Extruder with die diameter of 40 mm, preset temperature 220° C.
Adhesive layer (II): Extruder with die diameter of 40 mm, preset temperature 220° C.
EVOH layer (III): Extruder with die diameter of 30 mm, preset temperature 220° C.

Forming speed: 1.5 m/min

The LLDPE layers (I) that were used included LLDPE described below.

The EVOH layer (III) that was used included EVOH1 or EVOH2 described below. A laminate was produced using an EVOH layer (III) including EVOH1, and a laminate was fabricated using an EVOH layer (III) including EVOH2.

EVOH1: Ethylene/vinyl alcohol copolymer (ethylene content: 27 mol %, 25 mass % SEBS, MFR: 1.3 g/10 min)
EVOH2: Ethylene/vinyl alcohol copolymer (ethylene content: 44 mol %, MFR: 1.7 g/10 min)
LLDPE: Linear low-density polyethylene (ULTZEX 2021L manufactured by PRIME POLYMER CO., LTD.)

Example 2 and Comparative Examples 1 to 4

In Example 2 and Comparative Examples 1 to 4, adhesive resin compositions were prepared in the same manner as in Example 1, except that the formulation was changed as described in Table 2. Laminates were produced in the same manner as in Example 1 using the adhesive resin compositions, and the adhesive strength thereof was measured. The results are described in Table 2.

TABLE 2

| | | | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|---|---|
| Amounts (parts by mass) | PE-0 | | 9 | 9 | | 9 | 9 | 9 | 9 | |
| | PE-1 | | | | | | | | | 30 |
| | PE-2 | | 35 | 48 | 50 | 91 | 81 | 71 | 61 | 70 |
| | PE-3 | | 30 | 25 | | | 10 | 20 | 20 | |
| | PE-4 | | | | 30 | | | | | |
| | PE-5 | | 26 | 18 | 20 | | | | 10 | |
| Properties | MFR | g/10 min | 0.8 | 0.9 | 1.2 | 1.2 | 1.1 | 1.0 | 1.0 | 0.9 |
| | Density | kg/m³ | 919 | 919 | 920 | 926 | 921 | 916 | 919 | 928 |
| | Melting point | ° C. | 126 | 126 | 125 | 122 | 122 | 122 | 124 | 125 |
| CEF peak areas | 50° C. and below | % | 37 | 28 | 34 | 0 | 15 | 26 | 22 | 3 |
| | 90° C. and above | % | 37 | 31 | 32 | 14 | 12 | 11 | 24 | 35 |
| Adhesive strength with EVOH1 | | N/15 mm | 48 | 36 | 45 | 13 | 14 | 16 | 19 | 14 |
| Adhesive strength with EVOH2 | | N/15 mm | 55 | 57 | 55 | 53 | 51 | 52 | 54 | 21 |

As described in Table 2, good adhesive strength with respect to EVOH1 was achieved by the laminates of Examples 1 to 3 in which the proportion of CEF elution at 90° C. and above was not less than 25% and the proportion of CEF elution at 50° C. and below was not less than 20%. In contrast, the adhesive strength with respect to EVOH1 was low in Comparative Examples 1 to 5 in which the proportion of CEF elution at 90° C. and above was less than 25% or the proportion of CEF elution at 50° C. and below was less than 20%.

The invention claimed is:

1. An adhesive resin composition comprising an ethylene polymer (A) comprising an ethylene polymer graft-modified with an unsaturated carboxylic acid or a derivative thereof, the adhesive resin composition satisfying the following requirements (1) to (4), wherein the ethylene polymer (A) comprises an ethylene polymer (A1) described below and an ethylene polymer (A2) described below, and at least one of the ethylene polymer (A1) and the ethylene polymer (A2) comprises an ethylene polymer graft-modified with an unsaturated carboxylic acid or a derivative thereof:

(1) the melt flow rate (MFR) measured at a temperature of 190° C. and a load of 2160 g in accordance with ASTM D 1238 is 0.1 to 3 g/10 min, (2) the density is 910 to 930 kg/m$^3$, (3) the proportion of fractions that elute at 50° C. and below in crystallization elution fractionation chromatography measurement is not less than 20 mass %, and (4) the proportion of fractions that elute at 90° C. and above in crystallization elution fractionation chromatography measurement is not less than 25 mass %;

(A1) the ethylene polymer has a density of 930 to 965 kg/m$^3$ and a melt flow rate (MFR) of 0.1 to 10 g/10 min as measured at a temperature of 190° C. and a load of 2160 g in accordance with ASTM D 1238, (A2) the ethylene polymer has a density of 858 to 929 kg/m$^3$ and a melt flow rate (MFR) of 0.1 to 10 g/10 min as measured at a temperature of 190° C. and a load of 2160 g in accordance with ASTM D 1238.

2. The adhesive resin composition according to claim 1, wherein the ethylene polymer (A) comprises 20 to 40 mass % of the ethylene polymer (A1) and 60 to 80 mass % of the ethylene polymer (A2) the proviso that the total of the ethylene polymer (A1) and the ethylene polymer (A2) is 100 mass %.

3. A laminate comprising a layer (I) including an ethylene polymer, an adhesive layer (II) including an adhesive resin composition described in claim 1, and a layer (III) including an ethylene/vinyl alcohol copolymer and/or a layer (IV) including a polyamide resin, the layer (II) being in direct contact with at least one of the layer (III) and the layer (IV).

4. The laminate according to claim 3, wherein the ethylene/vinyl alcohol copolymer is a polymer obtained by saponifying an ethylene/vinyl acetate copolymer having a content of ethylene-derived structural units of 20 to 30 mol %.

5. The laminate according to claim 3, wherein the ethylene/vinyl alcohol copolymer is a polymer further including 10 to 40 mass % of a styrene elastomer.

6. The laminate according to claim 3, wherein the polyamide resin comprises at least one of nylon 6, nylon 66, nylon 610, nylon 12, nylon 11, MXD nylon, amorphous nylons and copolymer nylons.

7. A film comprising a laminate described in claim 3.

8. A bag comprising a film described in claim 7.

9. A packaging container comprising a laminate described in claim 3.

* * * * *